(12) United States Patent
Ouimette et al.

(10) Patent No.: US 9,172,798 B1
(45) Date of Patent: Oct. 27, 2015

(54) DETERMINING CALLING WINDOWS FOR CALLED TELEPHONE NUMBERS

(71) Applicant: Noble Systems Corporation, Atlanta, GA (US)

(72) Inventors: Jason P. Ouimette, Atlanta, GA (US); Juderic Trinidad, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 337 days.

(21) Appl. No.: 13/719,879

(22) Filed: Dec. 19, 2012

(51) Int. Cl.
H04M 3/00 (2006.01)
H04M 5/00 (2006.01)
H04M 3/42 (2006.01)

(52) U.S. Cl.
CPC ...... *H04M 3/42357* (2013.01); *H04M 3/42348* (2013.01); *H04M 2242/30* (2013.01)

(58) Field of Classification Search
CPC .......... H04M 3/5158; H04M 2242/30; H04M 3/42348
USPC ....................................... 379/207.12, 266.07
See application file for complete search history.

(56) References Cited

U.S. PATENT DOCUMENTS

| | | | |
|---|---|---|---|
| 7,016,480 B1 | 3/2006 | Saylor et al. | |
| 7,502,460 B2 * | 3/2009 | Rodenbusch et al. | 379/266.07 |
| 8,670,787 B1 | 3/2014 | Todd | |
| 2002/0168987 A1 | 11/2002 | Wang et al. | |
| 2003/0027576 A1 | 2/2003 | Fitzpatrick et al. | |
| 2005/0215242 A1 | 9/2005 | Black et al. | |
| 2006/0148458 A1 | 7/2006 | Komaria et al. | |
| 2006/0252438 A1 | 11/2006 | Ansamaa et al. | |
| 2006/0286970 A1 | 12/2006 | Otobe et al. | |
| 2007/0172050 A1 | 7/2007 | Weinstein et al. | |
| 2010/0246787 A1 | 9/2010 | Ray | |
| 2010/0254525 A1 | 10/2010 | Maly et al. | |
| 2010/0260327 A1 | 10/2010 | Ray | |
| 2010/0285780 A1 | 11/2010 | Collins | |
| 2011/0116618 A1 * | 5/2011 | Zyarko et al. | 379/266.07 |
| 2011/0237233 A1 | 9/2011 | Couse | |
| 2011/0250902 A1 | 10/2011 | Huang et al. | |
| 2012/0257738 A1 | 10/2012 | Mateos Perez et al. | |
| 2013/0036184 A1 | 2/2013 | Hung et al. | |
| 2013/0053027 A1 | 2/2013 | Lau et al. | |
| 2013/0109361 A1 | 5/2013 | Felt | |
| 2013/0203439 A1 | 8/2013 | Lifshitz et al. | |

OTHER PUBLICATIONS

Maestro 2010.1.1 User Manual, vol. 1, Aug. 17, 2010, 454 pages, Noble Systems Corporation, Atlanta, GA. 30319.*
Notice of Allowance Received for U.S. Appl. No. 13/755,015 dated Oct. 15, 2014.

(Continued)

*Primary Examiner* — Nafiz E Hoque

(57) ABSTRACT

A location determination rule is applied by a dialer when processing a telephone number of a target party in record from a dialing list. The location determination rule indicates how a geo-location of the target party is to be ascertained, so that the time zone of the target party is ascertained. Once the time zone is known, then a local time of the target party is ascertained, and a determination can be made whether a call can be originated to the target party within a prescribed calling window. The calling window indicates the beginning and ending times, local to the target party, when calls can be attempted to the target party. In one embodiment, the location determination rule can be defined for each record in the dialing list or for all records in the dialing list.

13 Claims, 4 Drawing Sheets

(56) References Cited

OTHER PUBLICATIONS

Maestro 2010.1.1 User Manual, vol. 2, Aug. 3, 2010, 416 pages, Noble Systems Corporation, Atlanta GA 30319.
Notice of Allowance Received for U.S. Appl. No. 13/467,101, dated Dec. 16, 2013.
Office Action Received for U.S. Appl. No. 13/755,015, dated Aug. 5, 2014.
Office Action Received for U.S. Appl. No. 13/467,101, dated Oct. 11, 2013.
Nobles Systems Corporation, Maestro 2010.4.1 User Manual, vol. 1, Jan. 11, 2012, 486 pages.
Nobles Systems Corporation, Maestro 2010.4.1 User Manual, vol. 2, Jul. 19, 2011, 422 pages.
Office Action Received for U.S. Appl. No. 13/467,101, Dated Jun. 6, 2013.

* cited by examiner

DETERMINING CALLING WINDOWS FOR CALLED TELEPHONE NUMBERS

BACKGROUND

Outbound call centers may originate telephone calls to targeted parties for various purposes. The calls may be made in conjunction with surveying individuals for a political campaign, notifying customers of suspicious charges on their credit card accounts, inquiring about repayment of past due loan amounts, soliciting donations for a non-profit organization, or offering new products for sale. In many instances, the call center may originate calls to individuals ("targeted parties") located in a variety of geographical areas. Frequently, the targeted party may be in another state than the state in which the call center is located. Thus, calls may originate in a call center that is hundreds, or even thousands of miles away from the contacted party. Consequently, the call center often is in a different time zone than that of the targeted party.

Various regulations may limit the times when certain types of calls may be attempted to the targeted party. For example, certain federal regulations may limit the origination of telemarketing calls between 8:00 a.m. and 9:00 p.m. The time period in which calls are allowed is sometimes called the "calling window." Some call center operators may define and use a more restrictive calling window, such as between 9:00 a.m. and 8:00 p.m. Further, some states may have more restrictive calling windows, including on certain days.

The calling window is defined with respect to the targeted party, not with respect to the call center. In other words, the call window times are defined as local to the targeted party. Thus, reference herein to "local time" means the local time of the targeted party. If both the call center and the targeted part are located in the eastern time zone, then the call center can originate a call to this targeted party at 8:30 a.m. However, the call center may not originate a call to a targeted party located in the pacific time zone, where the local time would be 3 hours earlier, e.g., 5:30 a.m. Therefore, the call center must know the local time of the targeted party in order to comply with the appropriate regulations defining the calling window. In order to determine this, the local time zone of the targeted party must be determined Determining the local time zone of the targeted party can be determined once the location of the targeted party is known, but determining the location of the targeted party may not always be a simple process. In some cases, the time zone of the targeted party can be determined by analyzing the targeted telephone number, but certain conditions may cause uncertainty. Further, other conditions may also impact how the targeted party's time zone is determined. Thus, flexible and effective systems and methods are required to ascertain the time zone of the targeted party.

BRIEF SUMMARY

Technologies are generally presented herein pertaining to processing a record in a dialing list comprising a plurality of records, where each record comprises a telephone number and location information, such as a zip code, in order to ascertain a location of a targeted party. Once the location of the targeted party is determined, a local time of the targeted party can be determined. A call to the targeted party can be originated if the local time of the targeted party is within an applicable calling window. In one embodiment, the targeted party's telephone number is analyzed to determine a geo-location of the telephone number which is compared with another geo-location based on the zip code in the record. If the geo-locations are distinct, then a location determination rule may be used to determine how to determine the appropriate location for the targeted party. The location determination rule may be specific for a given record or applied to the entire dialing list. The location determination rule provides additional flexibility in determining whether a call can be made to the targeted party within the appropriate calling window.

BRIEF DESCRIPTION OF THE DRAWINGS

Reference will now be made to the accompanying drawings, which are not necessarily drawn to scale, and wherein.

DETAILED DESCRIPTION

Figure 1:
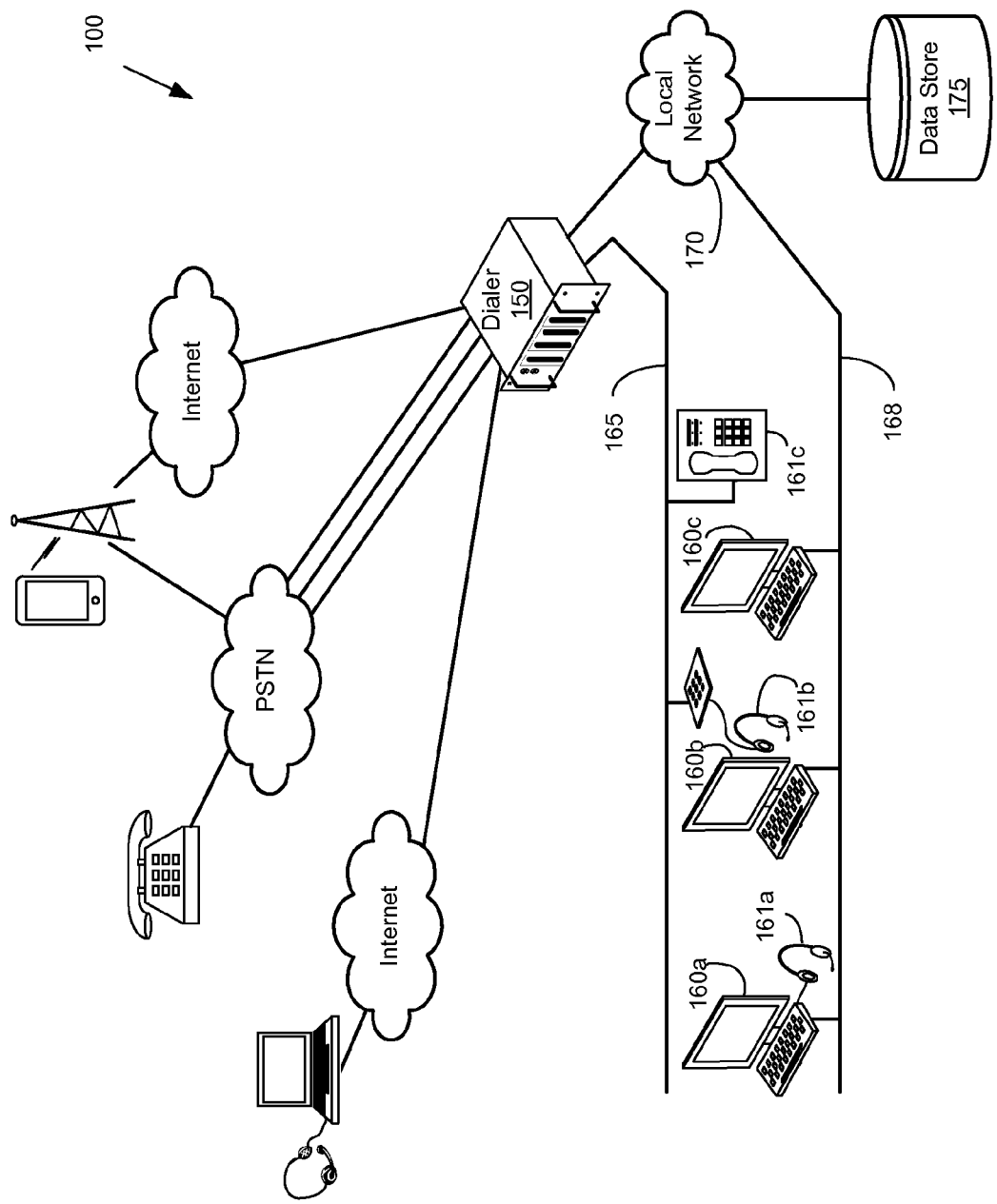
FIG. 1 shows an architecture of a call center which may employ the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center architecture 100 shown in FIG. 1 may involve voice calls that originate from the call center. Although many aspects of call center operation are disclosed in the context of voice calls, in various embodiments, the call center may process other forms of communication such as, for example, facsimiles, emails, text messages, video calls, and chat messages. That is, in various embodiments, the call center may be considered a contact center. However, for purposes of this disclosure, the term "call center" is used throughout, although it is understood that the principles may apply to a contact center.

In some embodiments, a call center may employ a dialer 150, such as a predictive dialer, to originate outbound calls on behalf of an agent at a rate designed to meet various criterion. Similar to the other components within the call center architecture 100, depending on the embodiment, the dialer 150 may comprise one or more software modules executing on a processing device hardware platform.

In various embodiments, outbound calls may originate from the dialer 150, which processes a dialing list, which is a collection of records retrieved from the data store 175. In one embodiment the data store 175 can be a database that stores the dialing list, and which contains other information on the targeted party. For example, each record may also include the targeted party's mailing or residential address. In certain embodiments, the data store 175 may be integrated with the dialer 150.

The dialing list may include hundreds or thousands of records, and these may not be sorted in any particular order, but may be dialed in sequence. Specifically, it is often the case that the records are not grouped together according to a particular destination or area code. One record may identify a targeted party in Maine, while the next record may identify a targeted party in Oregon.

The call originated by the dialer 150 may be directed to a targeted party at a computer, telephone or mobile device. The dialer will then connect that outgoing call to one of a plurality of call center agents, if it has not already done so.

In various embodiments, the outgoing call may be connected over facilities 165 to an agent for servicing. That is, for example, the targeted party may speak with an agent to receive customer service. The physical area at which the agent sits is often referred to as an agent "position" and these positions are often grouped into clusters managed by a supervisor, who may monitor calls and the agents' productivity. An agent typically uses a computing device 160a-160c, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

The above components may be referred to as a "computing device," "processing device," or "system." This may incorporate a local data store 175 and/or interface with an external data store. Further, the above components may be located remotely from (or co-located with) other components. Furthermore, one or more of the components may be implemented on a single processing device to perform the functions described herein. For example, in various embodiments, the functionality of the dialer 150 may also be incorporated with other call center components.

In addition, the call center architecture 100 may be provided as a hosted solution, where the call processing functionality is provided as a communication service (a so-called "communication-as-a-service" or "CaaS") to a call center operator. Thus, there is no requirement that the components identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Service Concepts

The term "calling window" herein refers to the time period wherein calls can be delivered to a targeted party. For purposes of illustration, the targeted party may be presumed to be situated in the locale of their city of residence. In many instances, the targeted party may be present in their residential house. In order to avoid targeted parties receiving telemarketing calls at undesirable hours in their residence, various regulations have been established limiting the times during which marketing calls can be offered. For example, federal regulations may limit the calling window for telemarketing calls between 8:00 a.m. and 9:00 p.m. based on the local time of the targeted party. It is possible for a state to have their own regulations, which may offer slightly more restrictive calling windows. For example, some states may have more restrictive calling windows for certain days (e.g., Sunday).

In other applications, the calls may not be telemarketing calls (and hence not limited by telemarketing calling windows), but the call center or originator may nevertheless limit calls to be within a calling window. Thus, calling windows may be used for non-telemarketing calls as well.

The call center originating the call may be located in a different geographical area and in a different time zone than the targeted party. Thus, a call center located in the eastern time zone ("ETZ") will have a three hour offset from a targeted party located in the pacific time zone ("PTZ"). Specifically, when it is 8:30 a.m. in the ETZ, it would be 5:30 a.m. in the PTZ. Using the above example of a calling window between 8:00 a.m. and 9:00 p.m., it may be appropriate for the call center to originate a call at 8:30 a.m. to a targeted party in the ETZ, but not at this same moment to a targeted party in the PTZ. Since there is a direct correlation between a geographical location and its corresponding time zone, it is appropriate to refer to the targeted party as being located in a particular time zone. It is also appropriate to refer to a targeted party (or the call) as being "within the calling window" if the local time of the targeted party is within the allowable times for offering calls. Similarly, the targeted party (or the call) may be referred to as being "outside the calling window" if the local time is outside the allowable times.

When reference is made to the "local time," this always refers to the time local relative to the targeted party, e.g., the time at the targeted party's location. Because the call center may be located in a different time zone, the time of the call center will usually be a number of hours ahead or behind the targeted party's local time. One approach for determining the local time of the targeted party is based on determining the location of the targeted party. If the location is determined, then the time can be determined. The targeted party's time is determined by determining the time zone for that location, and determine the number of hours offset (either added or subtracted) from the call center's current time to then determine the targeted party's local time. Returning to the previous example, if the call center knows it is 8:30 a.m. eastern time, then the call center knows that it is currently 7:30 a.m. central time, 6:30 a.m. mountain time, and 5:30 a.m. pacific time.

However, determining the location of the targeted party is not always easy. Traditionally, two main mechanisms have been used. First, information about the targeted party's residence may be used. Typically, a mailing address of the targeted party's residence may be known. The residential location information may include a city, state, and/or zip code. Typically, any of these indicators could be used to determine the geographic location, referred to herein as a "geo-location identifier" or "geo-location indicator." The geo-location indicator is a value that is sufficient to identify a time zone. More specifically, the combination of city and state, or the zip code, are usually sufficient to determine a unique location and hence, a time zone. Cases in which portions of a city or a zip code that straddle two time zones are presumed to be infrequent, and are exceptional cases. For purposes of illustration, and not limitation, examples herein use the zip code of the targeted party's residence as the geo-location identifier, but this is for convenience purposes only. In other embodiments, other forms of the geo-location identifier could be used.

The second mechanism that may be used to determine the location of the targeted party is their telephone number ("TN"). In the United States, the TN conforms to the North American Numbering Plan (NANP) and has a format that comprises an area code, an exchange code, and a line number. The TN has ten digits, with three digits assigned to the area code, three digits to the central office code, and four digits to the line number. The area code, also referred to as a Number Plan Area ("NPA") traditionally referred to a geographic area, such as a state or a region of a state. The allowable digits of the NPA are based on the first digit being one of the numbers 2-9, the second digit being a 0-9, and the third digit also being a 0-9. The exchange code, sometimes also referred to as a central office code, is in a format referred to as "NXX" where N=digits 2 through 9, and X is a digit 0-9. Thus, the combination of area code and exchange code is often referred to as "NPA-NXX". The line code is a four digit number where any digits can be used (e.g., 0-9). Thus, the ten digit telephone number was sometimes referred to as "NPA-NXX-XXXX."

Historically, the exchange code was assigned to a geographical area served by a wireline based central switching office ("central office"). Thus, a NPA-NXX would be associated with a geographic area, and databases were established allowing the coordinates of a switching serving the NPA-NXX. Knowing the coordinates of the switch allowed the location of the NPA-NXX to be determined, and hence the time zone of the TN could be ascertained.

With the advent of cellular service (wireless), blocks of telephone numbers, usually defined by an NPA-NXX, were assigned to a wireless carrier. The very nature of wireless service offers mobility to wireless users, so that it is not possible to predict where a wireless user would be. However, usually the NPA-NXX indicated where the party's home carrier was located and so that even in a traditional wireless environment, the NPA-NXX could indicate a likely geographical location of the serving switch of the targeted party, and would serve to be a likely indicator of the geographical area, and hence time zone, of the targeted party. The wireless carrier would maintain other databases to track the location of the party as they roamed from one serving switch to another.

Today, however, wireless service has become national in nature so seamless that a wireless subscriber may retain their wireless number even when moving across the country. Thus, it is frequently the case that wireless users keep their mobile TN when they reside in another location.

Further, number portability means that a given ten digit TN can be "ported" or served by any one of a number of carriers. Thus, the NPA-NXX portion of a telephone number may not be a good predictor of where the serving switch is located, although it is usually in the same time zone as other exchanges in that NPA. Finally, with the advent of voice over Internet Protocol ("VoIP"), even a wireline telephone number does not necessarily indicate where a targeted party is served. Essentially, knowing the NPA-NXX of the telephone number at best indicates a likelihood of the rough geographic area where a party may be located, but not with certainty.

Thus, using the NPA-NXX to establish a location of the targeted party, and hence a time zone, may not be effective in all cases for determining whether a call to the targeted party is within the allowed calling windows. For example, the subscriber may have an NPA-NXX based in a city of a state (e.g., Los Angeles), but that subscriber may have ported that number to a wireless carrier also serving Los Angeles, but now resides in New York city. When calling the subscriber from a call center located in the eastern time zone, it may be initially unclear whether the call is within the calling window. A call initiated by the call center at 8:30 a.m. to a subscribed located in New York city would be within the calling window, but if the subscriber is located in Los Angeles, then the call would be outside the calling window (e.g., 6:30 a.m. local time).

Typically, each record ("dialing record") in the dialing list contains the targeted party's telephone number and residence information. The record may indicate, e.g., that the targeted party's residence is in New York city, even though the telephone number has an NPA-NXX based in Los Angeles. Without any further information, it is unclear whether the targeted party is actually based in New York, or whether the dialing record information may be obsolete. For example, the party may have recently moved back to Los Angeles, and the residence information has not been updated.

To maintain compliance with applicable regulations, which again, may vary from state to state, call center operators may take a conservative approach. For example, if there is a discrepancy of where the targeted party is located when analyzing the NPA-NXX and the residential information (such as zip code), then the call center operator would arrange to call that party only during a "safe window." This would presume that the targeted party is in the farthest possible time zone in North America, and so appropriate time differences would be presumed. In other words, the call center operator could presume that no calls should be made to a party that could be located in the pacific time zone prior to 11:00 a.m. (eastern time). At this time, calls made from the eastern time zone would correspond to a local time of 11:00 a.m. eastern time, 10:00 a.m. central time, 9:00 a.m. mountain time, and 8:00 a.m. pacific time. All such calls would be within the opening calling window. Conversely, to avoid issues with the closing calling window times, the call center could cease calls at 9:00 p.m. (e.s.t.). This means that no calls would be made to any other time zone past the closing time. However, this means that the call center would end calling targeted parties in the pacific time zone at 6:00 p.m.

The approach described above uses the more restrictive of the two geo-locations as determined from the TN and the zip code to determine the location. More specifically, this restrictive approach assumes that given a choice between various time zones indicated by two geo-locations, the location is selected such that based on the local time, no call outside the calling window would result. Thus, if the call center is in the eastern time zone and the targeted party could be in the west coast, the call center would not place any calls later than 9:00 p.m., and none earlier than 11:00 a.m. This would ensure that no calls to the west coast are outside the calling window. On the other hand, if the call center is located in the pacific time zone, it would not place any calls to the east coasts later than 6:00 p.m. and none earlier than 8:00 a.m.

While this provides a level of safety and simplicity to the call center operator, it can lead to a drop in efficiency as the call center is not making as many calls as it can while still complying with the calling window regulations. It is possible to originate calls as late as midnight (e.s.t) to the pacific time zone that are within the calling window. Further, it is possible to originate calls as early as 8:00 a.m (e.s.t.) provided they are to targeted parties in the eastern time zone.

Process Flows

Figure 2:
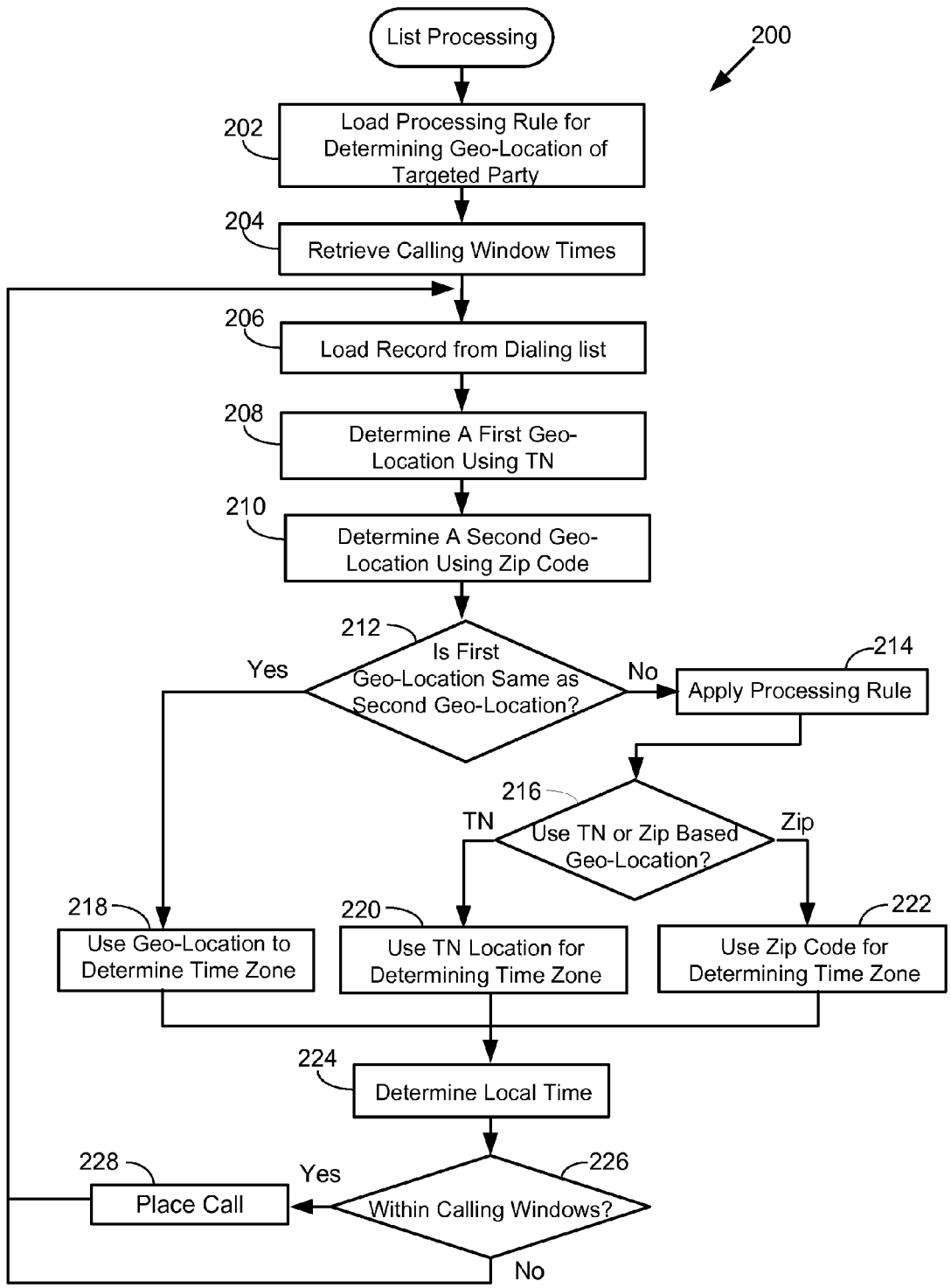
FIGS. 2-3 illustrate embodiments of process flows that may be used in determining the calling window for a call.

One embodiment for processing a dialing list and increasing the number of calls that the call center can originate is shown in FIG. 2. In this embodiment, a processing rule, referred to herein as a location determination rule, is established that can be selectively invoked to determine which data element in the dialing record, i.e., either the TN or the geo-location identifier from the residential address, should be used as the basis of determining the geo-location of the targeted party for purposes of establishing the local time.

The process 200 begins in operation 202 with the dialer loading the location determination rule for determining the geo-location of the targeted party. This rule may be defined and associated with each campaign in a distinct manner. Thus, a dialer originating calls for two lists (which may be associated with two campaigns) may employ different rules for how the geo-location of two different targeted parties may be determined.

In operation 204, the dialer loads the calling window times. For purposes of illustration, it is assumed this is a time period from 8:00 a.m. to 9:00 p.m., but other values may be defined. Further, state specific values may exist or the call center may have policies of its own that are more restrictive and that may be applied for a particular call.

In operation 206 the dialer loads a record from the dialing list. In instances where the process has looped back to this point, then the dialing record would be the next sequential record after the previously retrieved record. The dialing record typically has a fixed format, and will include the TN of the targeted party and typically will include a residence, address, or mailing location of the targeted party. For purposes of illustration, it is presumed that a postal code (e.g., a zip code) of the targeted party's address is included and is used as the geo-locator indicator. In other embodiments, the postal code may indicate a province or other designation.

Next, a first geo-location is determined using the TN in operation 208. The NPA-NXX portion of the TN may be used to access a database that maps the NPA-NXX to a geographical location. The geographical location is typically that of the serving area or location of a telephone or mobile switch associated with the NPA-NXX. The area can be indicated as a city, town, county, or even a zip code. Other designations are possible. For example, the NPA-NXX could be mapped to one of several statistical area designated by the U.S. Census Bureau. Typically, a location of the NPA-NXX reflects where the switch is based and is within the serving area of the switch serving area. For example, a switch located in New York city likely only serves New York city. In other embodiments, a switch located at the border between two states may serve an area straddling those two states. Various commercial databases are available which can indicate a geographical location of an NPA-NXX (or more accurately, the location of the switch the NPA-NXX is assigned to). Recall that the location of the switch may not be the same location of the targeted party for purposes of computing the calling window, but in many cases it will be adequate.

In operation 210 the dialer determines a second geo-location associated with the targeted party. This determination is based on the targeted party's address information maintained in the record, and for simplicity, it is presumed to be the targeted party's residential zip code. In various embodiments, this operation 210 could instead occur prior to operation 208, or simultaneously with operation 208.

A test in operation 212 determines whether the first geo-location as determined by using the TN matches the second geo-location as determined by using the zip code. However, in order to compare the locations, these must both use the same normalized basis. For example, the geo-location of a TN may indicate a suburban area (e.g., "Sandy Springs" in Georgia) which is a suburb of Atlanta, Ga. The targeted party's zip code may be associated with "Atlanta." Thus, it would appear that "Sandy Springs" and "Atlanta" are different areas, but for purposes of determining a location for ascertaining a time zone, these would be the same area. In order to facilitate the comparison, the same location metric should be used.

One normalized location metric may be areas defined by the U.S. census bureau. This could be, for example, a metropolitan statistical area ("MSA") of which there are 366 MSAs in the U.S. If one or more MSA significantly straddle time zones, then a smaller area known as micropolitan statistical areas can be used. There are presently 576 micropolitan statistical areas designated in the U.S. Or, the normalized geographic location metric could be city name or a zip code. Various embodiments may use different normalized identifiers. In the above example, Sandy Springs and Atlanta are in the same MSA and the MSA could be the normalized metric.

Once the geo-location of the TN is associated with a normalized metric and the geo-location of the zip code is normalized to the same metric, then a comparison can be made. For example, the NPA-NXX of 404-851 could be normalized to "Atlanta" as an MSA and the zip code of 30319 could also be normalized to the MSA of "Atlanta." Thus, the geo-location of the TN is the same as the geo-location of the zip code.

As noted, other embodiments may use different normalized metrics that are resolved to determine whether one location is within or the same as another location. For example, a database or other web-server could provide an indication of whether there is any geographical overlap between the area served by NPA-NXX of 404-851 and the zip code 30319. For example, an information server could return all the zip codes served by a given NPA-NXX. A scan of the list of associated zip codes would allow a ready determination of whether the zip code 30319 is included. In this case, the normalized metric could be a zip code.

Thus, operation 212 determines if the location determined using the NPA-NXX is the same as the location determined using the zip code. Various embodiments can be used to determine what normalized metric is used, and whether the location is the same for purposes of determining a time zone. If the result is that the geo-locations are in the same location (however the normalization metric is defined), then that location can be used in operation 218 for determining the local time zone of the targeted party. Because the first geo-location using the TN is the same as the second geo-location using the residential information, there is no need in this processing branch flow to invoke the location determination rule.

However, if in operation 212 the normalized geo-locations are different, then an issue arises as to which value should be used. In this case, the location determination processing rule can be invoked to determine the appropriate individual logic to be applied to resolve a potential discrepancy. A typical situation is when the targeted party has a wireless phone that was originally obtained in one locale (e.g., state A), but the targeted party has since moved to another locale (e.g., state B). Rather than give up their wireless telephone number, the targeted party opted to retain the wireless number, even though it may be obvious that the number is not local with his current residence.

In this example, prior knowledge may be recorded in the dialing record to confirm that the user resides in state B, even though their telephone number would be conventionally associated with state A. The processing rule in this embodiment may dictate that in operation 216 that the zip code geo-location indicator should be used in operation 222. In other words, the zip code geo-location takes priority over (or overrides) the TN based geo-location. If so, then this value is used in operation 224 for determining the local time for the targeted party.

On the other hand, it may be that the processing rule indicates to use the TN based geo-locator as indicated in operation 216. For example, the targeted party may reside in state A, and the address and zip code maintained in the dialing record is obsolete (e.g., it is a last known address, as opposed to a current address). The targeted party may have moved, but the targeted party address was not updated. In this case, it may be more appropriate to use the TN based geo-locator for determining the local time in operation 224. In other embodiments, the targeted party may maintain a mailing address in one state, but may reside on a temporary, but long term basis, in another state.

In operation 226 a test is made to determine whether the local time of the targeted party is within the defined calling windows. The calling window may depend on the particular destination used. For example, different states may have different calling windows, so that the appropriate calling window for that location should be used. For example, if the location determination rule indicates to use the zip code, then the calling window for that state may be used. If the local time is within the calling window, then in operation 228 the call may be placed. If the local time is not within the applicable calling window, then the call attempt is skipped. In either case, the next record in the dialing list is obtained in operation 206 and the process repeats.

The processing rule defining how the applicable calling window is determined for a dialing record can be expanded in additional embodiments. It is possible that additional analysis of external information associated with the TN can result in a more accurate assessment and application of the calling window. However, in some embodiments this may require accessing additional databases that maintain additional information about the number.

In one embodiment, the dialing record may be associated with a targeted party wherein it is known what location and/or time zone the targeted party is in. The location of the targeted party may have been ascertained previously, through any number of approaches. In one embodiment, if the number is known to be wireless, a location database could be queried which provides the targeted party's current location. In another embodiment, the appropriate location information may be explicitly maintained in the dialing record, or as a flag in the dialing record indicating that such information is available in another database. In another embodiment, an explicit time zone could be indicated in the dialing record. Regardless of the form, the presence of this location information may override a geo-location that would otherwise have been determined by the TN or a geo-location determined by residential address location. The location information may be applicable in circumstances where the address in the dialing record is a mailing address, as opposed to a residence location. In other embodiments, the dialing record may have both a mailing address and a residence location. In this case, the residence location could override using the mailing address.

In other embodiments, different processing rules may apply depending on whether the TN is a ported number or not. A ported TN can be defined in one embodiment as a telephone number having an NPA-NXX that is not serviced by the original responsible organization ("resp-org") that was initially assigned to handle that number. So, by way of example, a NPA-NXX may have been originally assigned to Wireless Carrier A as the responsible carrier. Wireless Carrier A in turn may have allocated the ten digit TN to their customer (e.g., the targeted party), but that targeted party has since switched their service to Wireless Carrier B by porting their TN to Wireless Carrier B. Or, in another example, the targeted party may have ported their TN originally assigned by a wireline (e.g., landline) carrier to a wireless carrier. Or, in another embodiment, the TN may be selected from an NPA-NXX where the TN was ported to an Internet based phone provider, allowing the targeted party to access the service from a variety of locations. In each of these, the ported number may have an NPA-NXX that is no longer associated with the location of the original responsible organization, and other rules may be defined for indicating how the location of the targeted party should be determined.

Figure 3:
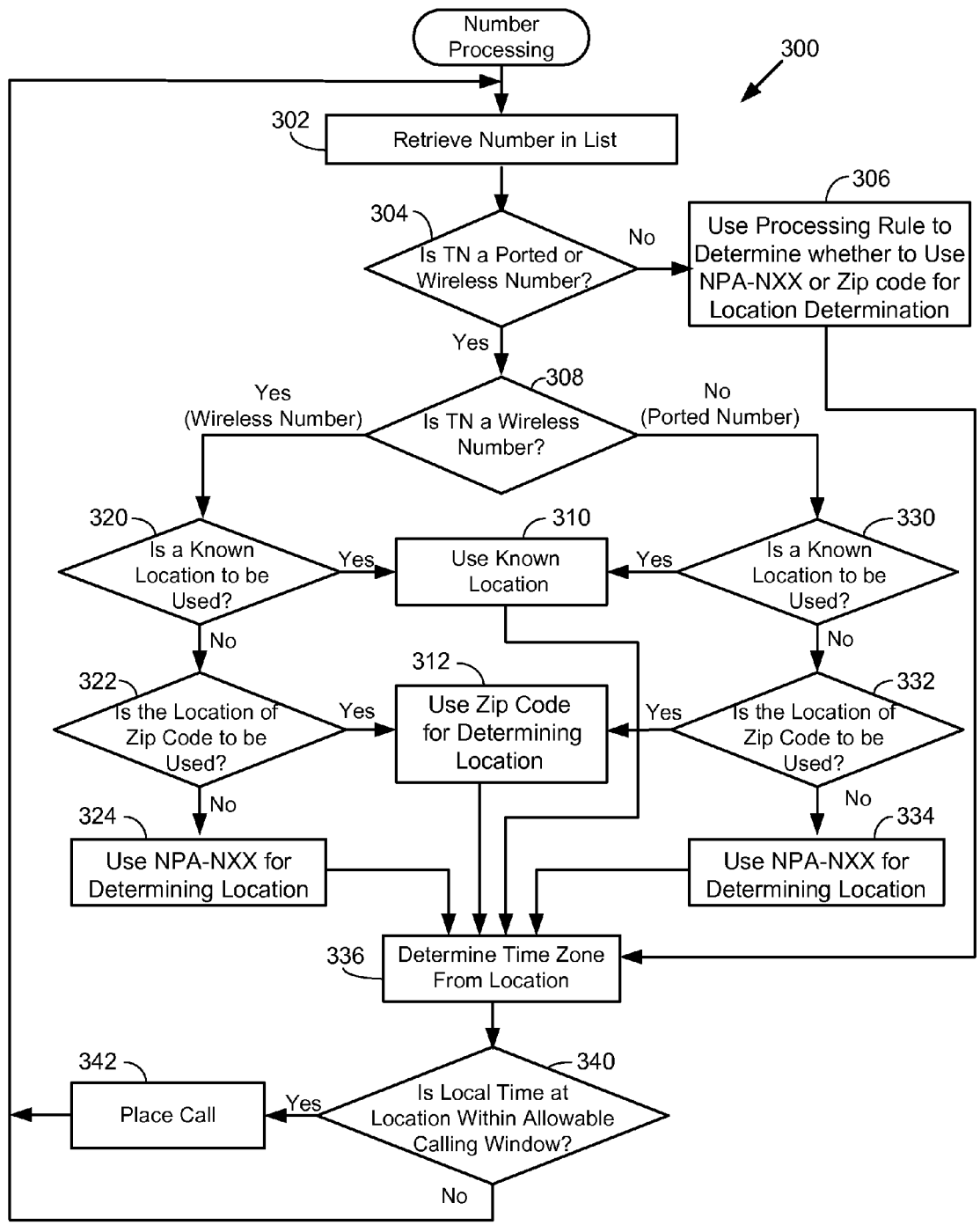

One process flow illustrating additional processing rules that may be applied is shown in FIG. 3. The process 300 begins with retrieving the TN of the dialing record in operation 302. Upon the first pass through the dialing list, the initial record is retrieved, whereas on subsequent passed, the next record is retrieved.

An initial determination is made whether the TN is a ported or wireless number in operation 304. This may require accessing a database to indicate whether the number is a ported number or a wireless number. Various commercial databases or services are available to determine whether the TN is a wireless number or has been ported. If the answer is no (e.g., it is not either a wireless or ported number), then this suggests the number is a wireline number that has not been ported. In operation 306, the processing rule described in FIG. 2 may be applied. Namely, the location of the TN may be compared with a location based on the targeted party's residence (e.g., zip code). Then, in one embodiment, the rule may indicate to use the geo-location based on the NPA-NXX may be used, whereas in another embodiment the geo-location based on the residence may be used. In either embodiment, the processing proceeds with operation 336 to determine the time zone from the location. If the local time is within the calling window for that location in operation 340, then the call is placed in operation 342. If not, then the next record is retrieved by looping back to operation 302.

Returning to operation 304, if the TN is a ported or wireless number, then further unique processing rules may be applied for the retrieved TN based on whether it is a wireless or ported TN. First, in operation 308 a test determines whether the TN is a wireless number. If the number is a wireless number, then a determination (not shown) may be applied to determine if the call is even allowed. Various regulations may apply with respect to contacting a wireless number.

Assuming that a call can be made to the wireless number, the determination of the calling window may involve a test in operation 320 to determine if a known location is to be used. This may be the location associated with the residence, or some other data indicating where the caller is located, including accessing any available location databases indicating a current location of the target party. If so, then in operation 310 this known location is used and the process determines the local time tone based on this location in operation 336.

If in operation 320 there is no known location that is to be used, then in operation 322 a determination is made whether to use a location associated with the zip code based on the residence location in the record. If the answer is yes, then the zip code is used for determining the location in operation 312. If in operation 322 the zip code is not to be used, then in operation 324 the NPA-NXX is used for determining the location.

The above processing logic allows custom rules for processing to be applied for handling the location determination for each record having a wireless number. A similar logic flow allows custom rule processing to be applied if the wireless is a ported number, e.g., one that is not wireless. Specifically, if in operation 308 it is determined that the TN is not currently a wireless number, but is a ported number, then it can be presumed in one embodiment that the TN is a ported wireline number. In this case, a determination is made in operation 330 whether a known location is to be used, e.g., whether a known location is to override using the zip code or NPA-NXX for determining the location. If the answer is yes in operation 330, then that location is used for determining the location in operation 310. If, instead in operation 330 the answer is no, then in operation 332 a test is made to see whether the zip code associated with the residence should be used as the basis for determining the location. If the answer is yes, then in operation 312 the zip code is used to determine the location. If the answer is no in operation 332, then the NPA-NXX is used for determining the location.

Once the basis for determining the location is known, then the time zone in operation 336 can be determined. If the calling window for that location are not met in operation 340, then no call is originated. If the calling window is met, then a call can be placed in operation 342. In either case, the process loops back to operation 302 where the next record is processed.

The above allows a processing rule to be defined for handling a wireless number distinct from a ported, wireline number. The processing rule can be indicated on a list basis or on a per-record basis. If indicated on a per-record basis, then a field in each record can indicate which rule should be applied.

Application of the location determination rule allows a call center to more accurately comport with a set calling window. For example, the call center processing a dialing record for targeted party A may determine the TN is a wireless number and more accurately determine the geo-location based on the zip code of the residence of targeted Party A. On the other hand, the call center could determine the geo-location for targeted party B based on a defined geo-location, even though targeted party B also has a wireless number. A third targeted party, targeted party C could result in having the location of the NPA-NXX used as the basis of the location.

One skilled in the art could define as a number of variations for how the processing rules are defined and applied in light of the present disclosure. These variations could be applied on a per record basis, or on a list basis (e.g., all records in the list). By allowing additional flexibility in determining the location of the targeted party, the call center can make a greater volume of calls, and adhere to applicable regulations with respect to calling windows.

International Dialing Applications

The above examples are predicated on using the North American Numbering Plan ("NANP"), which is defined as a dialing plan within the telephony dialing standards defined by the International Telecommunications Union. The NANP comprise the NPA-NXX format, but numbering plans for other countries may have different structures. The technologies and concepts disclosed herein can be adapted to handling numbering plans outside the NANP so that calls originating from a location can adhere to calling windows for locations outside the NANP. This may require defining tables that map the number to a location consistent with that numbering plan. Those skilled in the art will be able to readily adapt the concepts and technologies herein for calls outside the NANP.

Exemplary Computer Processing Device

Figure 4:
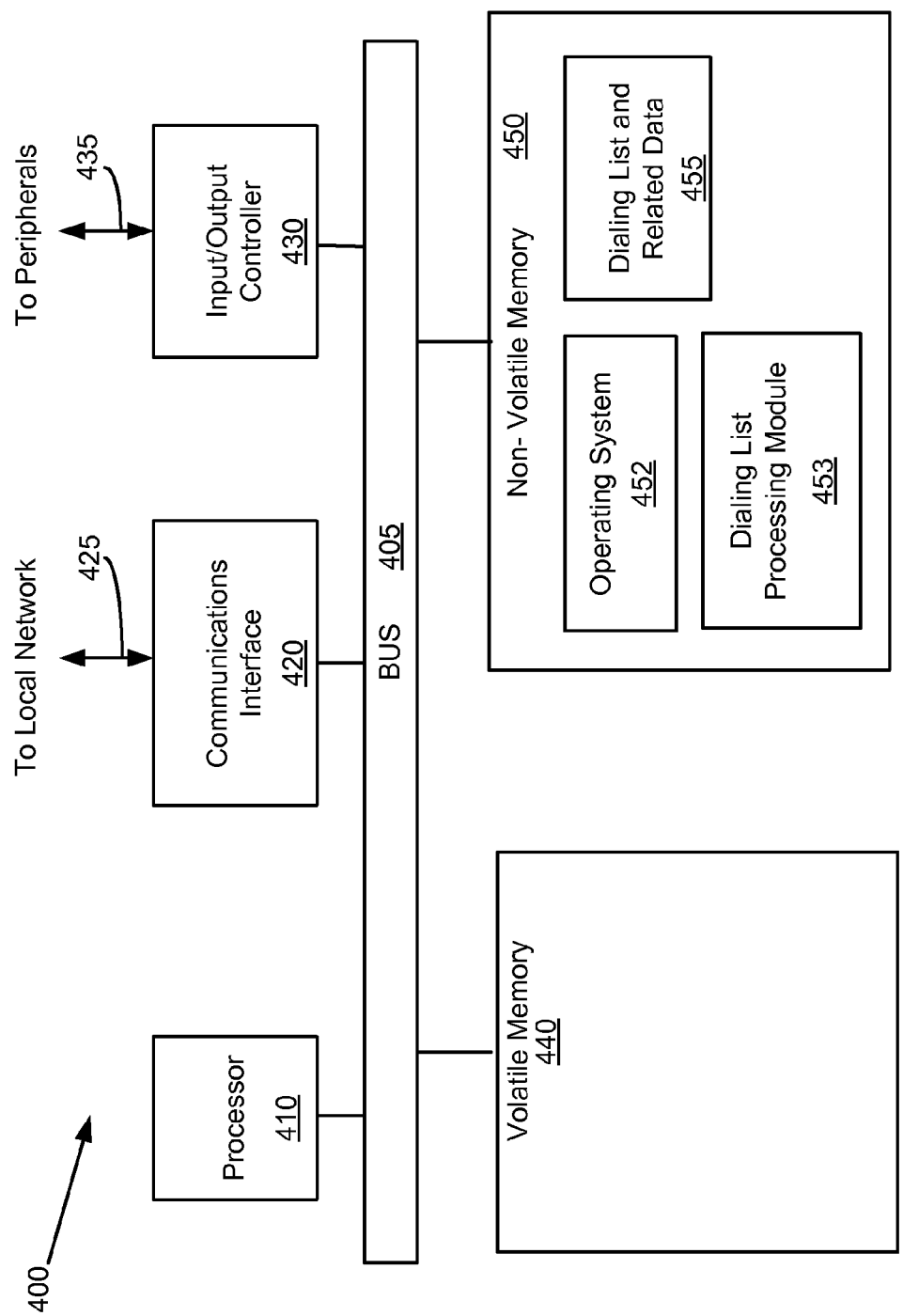
FIG. 4 illustrates one embodiment of a processing device comprising a dialer for practicing the technologies and concepts herein.

FIG. 4 is an exemplary schematic diagram of a computer processing system that may be used in an embodiment of the call center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 4, the processing system 400 may include one or more processors 410 that may communicate with other elements within the processing system 400 via a bus 405. The processor 410 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 400 may also include one or more communications interfaces 420 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 430 may also communicate with one or more input devices or peripherals using an interface 435, such as, but not limited to: a keyboard, a mouse, a touch screen/display input, microphone, pointing device, etc. The input/output controller 430 may also communicate with output devices or peripherals, such as displays, printers, speakers, headsets, banner displays, etc. These may be used, in part, to receive Administrator input, including for interacting with the manual agent selection module.

The processor 410 may be configured to execute instructions stored in volatile memory 440, non-volatile memory 450, or other forms of computer readable storage media accessible to the processor 410. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 450 may store program code and data, which also may be loaded into the volatile memory 440 at execution time. Specifically, the non-volatile memory 450 may store one or more dialing list processing modules 453 that may perform the above mentioned process flows and/or operating system code 452 containing instructions for performing the process and/or functions associated with the technologies disclosed herein. The dialing list processing module 453 may also access, generate, or store the dialing list and related data 455, including the data described above in conjunction with the location determination rule, in the non-volatile memory 450, as well as in the volatile memory 440. In other embodiments, the calling window tables, geo-location tables for mapping values to a normalized metric may also be stored here. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 410. These may form a part of, or may interact with, the dialing list processing module 453.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method of determining whether to originate a telephone call to a target party by a predictive dialer processing a dialing list in a call center, the method comprising:
   storing a location determination rule in the predictive dialer indicating how to determine a geo-location associated with the target party of a dialing record in the dialing list;
   storing a calling window table comprising at least one calling window in the predictive dialer, the calling window indicating a time period having a beginning time and an ending time;
   retrieving a dialing record comprising a telephone number ("TN") associated with the target party, wherein the TN comprises an NPA-NXX and the dialing record further comprises at least a portion of a postal address associated with the target party, the postal address further comprising a postal code;
   determining based on the location determination rule whether to use the NPA-NXX or the postal code to determine the geo-location of the target party wherein the location determination rule comprises querying a local number portability database to determine whether the TN has been ported, and if the TN has been ported, then using the postal code to determine the geo-location, and if the TN has not been ported, then not using the postal code as the geo-location;
   if the location determination rule indicates using the NPA-NXX to determine the geo-location of the target party, then using a first geo-location value associated with the NPA-NXX as the geo-location and if the location determination rule indicates using the postal code to determine the geo-location of the target party, then using a second geo-location value associated with the postal code as the geo-location;
   ascertaining a local time associated with the target party using a current time at the predictive dialer and a time zone associated with the geo-location; and
   establishing the telephone call to the target party by the predictive dialer if the local time of the target party is within the time period of the calling window and not establishing the call to the target party if the local time associated with the target party is outside of the time period of the calling window.

2. The method of claim 1, wherein the calling window is associated with a geographical area and the geo-location is within the geographical area.

3. The method of claim 1, wherein the location determination rule is defined to be applicable for the dialing record.

4. The method of claim 1, wherein the location determination rule is defined to be applicable to all dialing records in the dialing list.

5. A non-transitory computer readable tangible media storing instructions that when executed by a processor cause the processor to:
   retrieve a location determination rule in a predictive dialer indicating how to determine a geo-location associated with a target party of a dialing record in a dialing list;
   retrieve a calling window table in the predictive dialer comprising at least one calling window, the calling window indicating a time period having a beginning time and an ending time;
   retrieve the dialing record comprising a telephone number ("TN") associated with the target party, wherein the TN comprises an NPA-NXX and the dialing record further comprises at least a portion of a postal address associated with the target party, the postal address further comprising a postal code;
   determine based on the location determination rule whether to use the NPA-NXX or the postal code to determine the geo-location of the target party, wherein the location determination rule comprises querying a local number portability database to determine whether the TN has been ported, and if the TN has been ported, then using the postal code to determine the geo-location, and if the TN has not been ported, then not using the postal code as the geo-location;
   if the location determination rule indicates using the NPA-NXX to determine the geo-location of the target party, then use a first geo-location value associated with the NPA-NXX as the geo-location and if the location determination rule indicates using the postal code to determine the geo-location of the target party, then use a second geo-location value associated with the postal code as the geo-location;
   ascertain a local time associated with the target party using a current time at the predictive dialer and a time zone associated with the geo-location; and
   establish the telephone call to the target party by the predictive dialer if the local time of the target party is within the time period of the calling window and not establishing the call to the target party if the local time associated with the target party is outside of the time period of the calling window.

6. The non-transitory computer readable tangible media of claim 5, wherein the calling window is associated with a geographical area and the geo-location is within the geographical area.

7. The non-transitory computer readable tangible media of claim 5, wherein the location determination rule is defined to be applied to the dialing record.

8. The non-transitory computer readable tangible media of claim 5, wherein the location determination rule is defined to be applied to all dialing records in the dialing list.

9. The non-transitory computer readable tangible media of claim 5, wherein the processor is a processor in a call handling system comprising a dialer in a contact center.

10. The non-transitory computer readable tangible media of claim 5, wherein the location determination rule further comprises determining a first geo-location associated with the NPA-NXX of the TN is different from a second geo-location associated with the postal code before querying the local number portability database.

11. The non-transitory computer readable tangible media of claim 5, wherein the postal code is a zip code.

12. A system for determining whether to originate a telephone call to a target party by a predictive dialer processing a dialing list in a call center, the system comprising a processor configured to:
   retrieve a location determination rule indicating how to determine a geo-location associated with the target party of a dialing record in the dialing list;
   retrieve a calling window table comprising at least one calling window, the calling window indicating a time period having a beginning time and an ending time;
   retrieve the dialing record comprising a telephone number ("TN") associated with the target party, wherein the TN comprises an NPA-NXX and the dialing record further comprises at least a portion of a postal address associated with the target party, the postal address further comprising a postal code;
   determine based on the location determination rule whether to use the NPA-NXX or the postal code to determine the geo-location of the target party, wherein the location determination rule comprises querying a local number portability database to determine whether the TN has been ported, and if the TN has been ported, then using the postal code to determine the geo-location, and if the TN has not been ported, then not using the postal code as the geo-location;
   if the location determination rule indicates using the NPA-NXX to determine the geo-location of the target party, then use a first geo-location value associated with the NPA-NXX as the geo-location and if the location determination rule indicates using the postal code to determine the geo-location of the target party, then use a second geo-location value associated with the postal code as the geo-location;
   ascertain a local time associated with the target party using a current time at the predictive dialer and a time zone associated with the geo-location; and
   establish the telephone call to the target party by the predictive dialer if the local time of the target party is within the time period of the calling window and not establishing the call to the target party if the local time associated with the target party is outside of the time period of the calling window.

13. The system of claim 12, wherein the system is a call handler system comprising a dialer in a contact center.

* * * * *